(12) United States Patent
Peng et al.

(10) Patent No.: US 8,289,696 B2
(45) Date of Patent: Oct. 16, 2012

(54) MOUNTING APPARATUS FOR DATA STORAGE DEVICE

(75) Inventors: Wen-Tang Peng, Taipei Hsien (TW); Jun-Xiong Zhang, Shenzhen (CN); Si-Wen Shu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 108 days.

(21) Appl. No.: 12/824,445

(22) Filed: Jun. 28, 2010

(65) Prior Publication Data
US 2011/0043993 A1 Feb. 24, 2011

(30) Foreign Application Priority Data
Aug. 21, 2009 (CN) .......................... 2009 1 0305910

(51) Int. Cl.
*G06F 1/16* (2006.01)
*H05K 5/00* (2006.01)
*H05K 7/00* (2006.01)

(52) U.S. Cl. .................... 361/679.39; 361/727

(58) Field of Classification Search ............. 361/679.31, 361/679.34, 679.39, 679.55, 679.41, 724–727; 312/301, 334.5, 334.44, 334.46, 333
See application file for complete search history.

(56) References Cited

U.S. PATENT DOCUMENTS

| | | | | |
|---|---|---|---|---|
| 2,168,022 A * | 8/1939 | Drager | ........................ | 160/231.2 |
| 2,276,635 A * | 3/1942 | Weber | ........................... | 220/349 |
| 3,265,935 A * | 8/1966 | Rosa | ............................... | 361/796 |
| 3,751,127 A * | 8/1973 | Black et al. | .................... | 312/111 |
| 4,384,750 A * | 5/1983 | Hager | ............................ | 312/296 |
| 5,510,955 A * | 4/1996 | Taesang | .................... | 361/679.31 |
| 5,730,515 A * | 3/1998 | Ho | ................................. | 312/350 |
| 5,738,226 A * | 4/1998 | Dean | ........................... | 211/41.17 |
| 6,038,126 A * | 3/2000 | Weng | ....................... | 361/679.01 |
| 6,122,173 A * | 9/2000 | Felcman et al. | .............. | 361/726 |
| 6,339,532 B1* | 1/2002 | Boulay et al. | ............. | 361/679.33 |
| 6,633,481 B2* | 10/2003 | Pavol | ....................... | 361/679.36 |
| 6,661,677 B1* | 12/2003 | Rumney | ........................ | 361/818 |
| 6,972,961 B2* | 12/2005 | Erskine | ......................... | 361/727 |
| 7,137,767 B2* | 11/2006 | Franke et al. | ................. | 411/401 |
| 7,145,776 B2* | 12/2006 | King et al. | ..................... | 361/725 |
| 7,190,574 B2* | 3/2007 | Muenzer et al. | ......... | 361/679.32 |
| 7,277,296 B2* | 10/2007 | Ice | ................................ | 361/756 |
| 7,289,317 B2* | 10/2007 | Hood et al. | .............. | 361/679.33 |
| 7,298,624 B2* | 11/2007 | Boswell et al. | .............. | 361/727 |
| 7,701,704 B2* | 4/2010 | Huang et al. | ............. | 361/679.36 |
| 7,726,755 B2* | 6/2010 | Peng et al. | ............... | 312/334.46 |

(Continued)

*Primary Examiner* — Adrian S Wilson
(74) *Attorney, Agent, or Firm* — Altis Law Group, Inc.

(57) ABSTRACT

A mounting apparatus is provided to hold a number of data storage devices each including opposite sidewalls. The mounting apparatus includes a bracket, a number of fasteners, and a number of fixing members. The fasteners are fixed to the sidewalls of the data storage devices, respectively, and each fastener includes a head portion abutting the corresponding sidewall. Each fixing member includes a main body fixed to the bracket, and guiding rails fixed to opposite sides of the main body. Each guiding rail defines a sliding groove. A receiving space is formed between two adjacent fixing members to accommodate the data storage devices. Every sliding groove facing a receiving space is paired with an opposite sliding groove facing the same receiving. When the data storage devices are moved into the receiving spaces along the fixing members, respectively, the head portions are slid into the corresponding paired sliding grooves.

9 Claims, 5 Drawing Sheets

U.S. PATENT DOCUMENTS

| | | | |
|---|---|---|---|
| 7,744,175 B2 * | 6/2010 | Peng et al. | 312/333 |
| 7,753,460 B2 * | 7/2010 | Peng et al. | 312/334.46 |
| 7,794,029 B2 * | 9/2010 | Peng et al. | 312/333 |
| 2004/0246674 A1 * | 12/2004 | Chen | 361/685 |
| 2005/0135069 A1 * | 6/2005 | King et al. | 361/727 |
| 2007/0127204 A1 * | 6/2007 | Muenzer et al. | 361/685 |
| 2007/0247802 A1 * | 10/2007 | Imsand | 361/685 |
| 2007/0296318 A1 * | 12/2007 | Peng et al. | 312/334.44 |
| 2008/0124009 A1 * | 5/2008 | Peng et al. | 384/21 |
| 2008/0129170 A1 * | 6/2008 | Peng et al. | 312/334.44 |
| 2008/0141496 A1 * | 6/2008 | Peng et al. | 16/94 R |
| 2008/0164795 A1 * | 7/2008 | Peng et al. | 312/334.5 |
| 2008/0303393 A1 * | 12/2008 | Krinsly | 312/294 |
| 2009/0257185 A1 * | 10/2009 | Signer et al. | 361/679.32 |
| 2011/0001409 A1 * | 1/2011 | Peng et al. | 312/301 |
| 2011/0043992 A1 * | 2/2011 | Peng et al. | 361/679.31 |

* cited by examiner

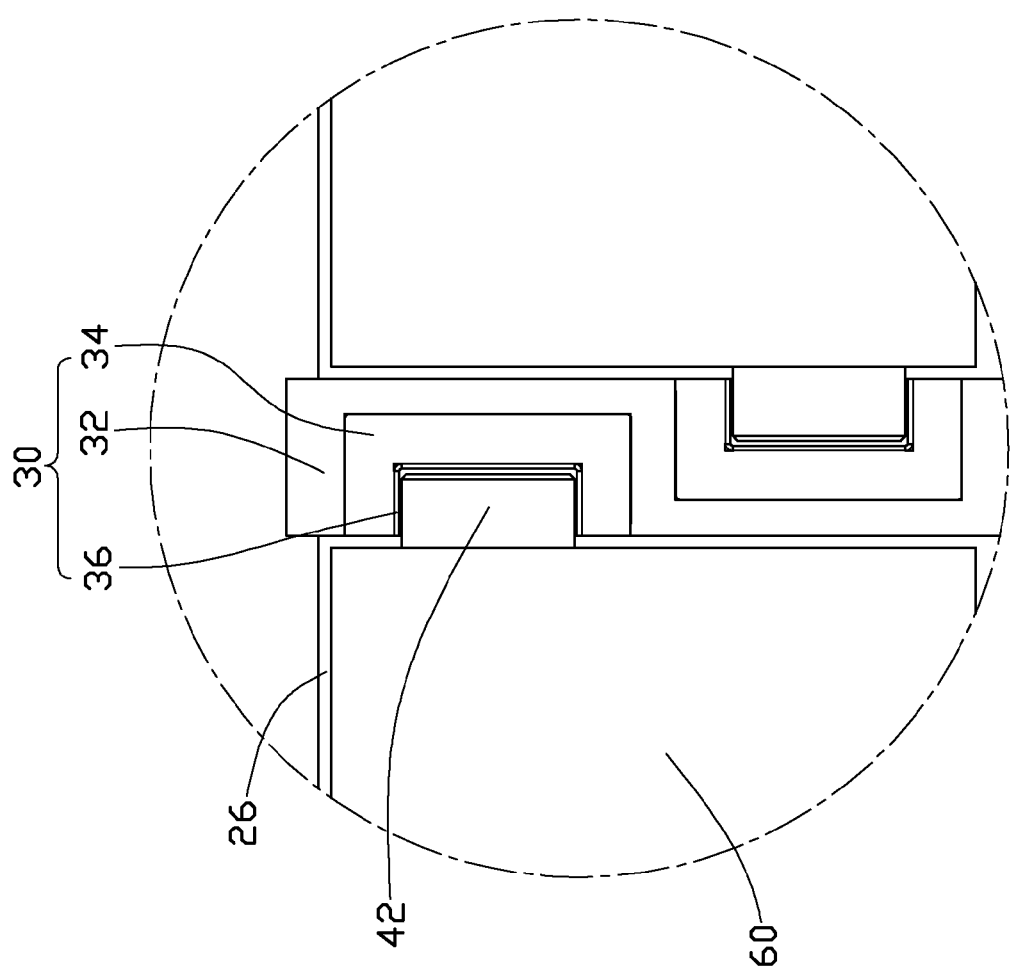

MOUNTING APPARATUS FOR DATA STORAGE DEVICE

CROSS-REFERENCE TO RELATED APPLICATION

This application is related to a co-pending U.S. patent application, entitled "MOUNTING APPARATUS FOR DATA STORAGE DEVICE", with the application Ser. No. 12/615,240, and filed on Nov. 9, 2009, which is assigned to the same assignee as named herein.

BACKGROUND

1. Technical Field

The disclosure relates to mounting apparatuses for data storage devices, and particularly to a mounting apparatus for saving mounting space in a computer enclosure.

2. Description of Related Art

Generally speaking, a bracket is mounted in a computer enclosure, to which a storage device will be attached. However, it is common now to house several storage devices, which leads to an increase in size and complexity of the computer.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 5 is an enlarged view of the circled portion V of FIG. 4.

DETAILED DESCRIPTION

The disclosure, incorporating the accompanying drawings in which like references indicate similar elements, is illustrated by way of examples not by way of limitation. It should be noted that references to "an" or "one" embodiment in this disclosure are not necessarily to the same embodiment, and such references mean at least one.

Figure 1:
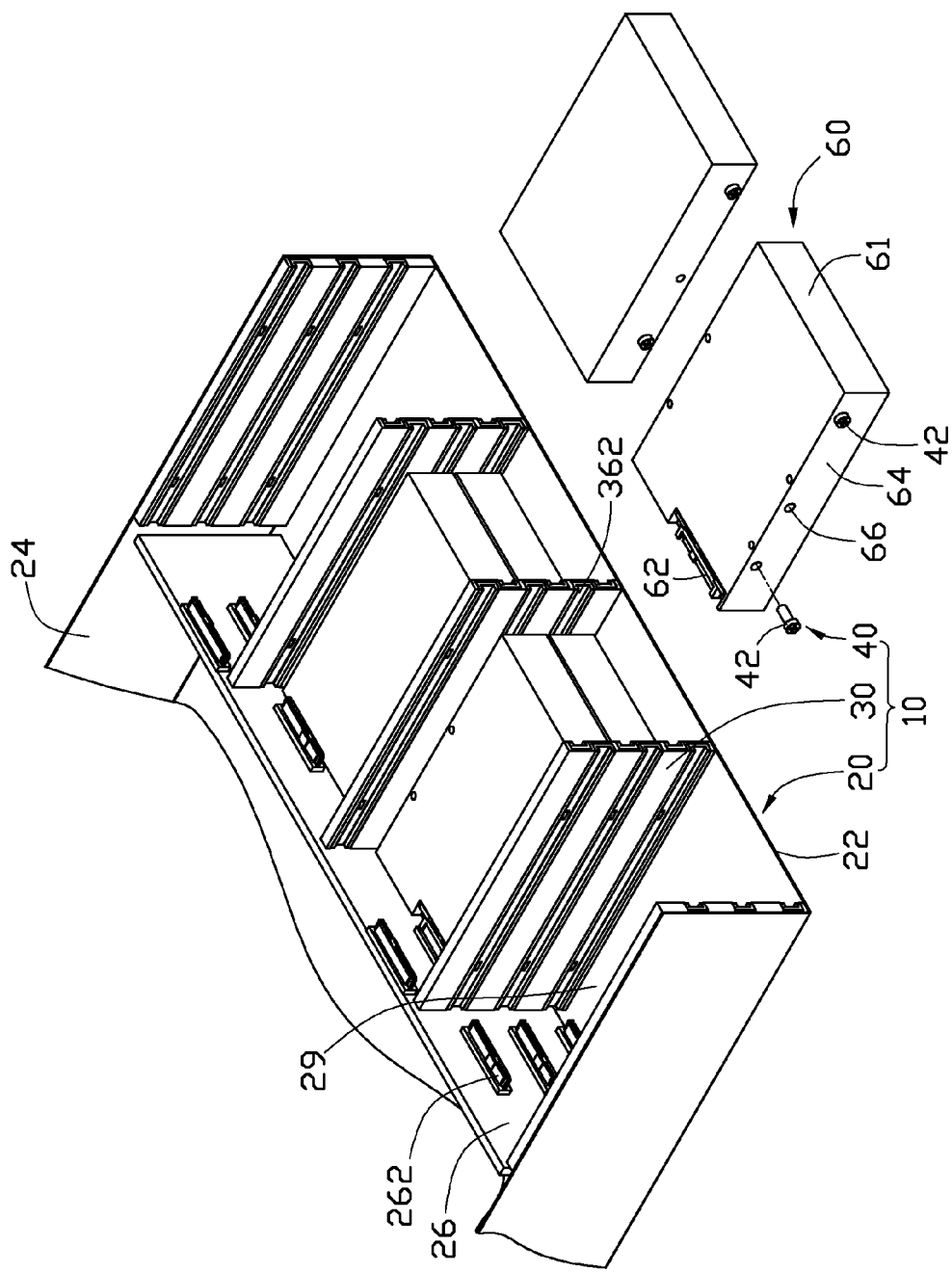
FIG. 1 is an exploded, isometric view of an exemplary embodiment of a mounting apparatus with a plurality of data storage devices, the mounting apparatus including a plurality of fixing members.

Referring to FIG. 1, an exemplary embodiment of a mounting apparatus 10 is provided to fix a plurality of data storage devices 60. The mounting apparatus 10 includes a bracket 20, a plurality of fixing members 30, and a plurality of fasteners 40.

Each data storage device 60 includes two opposite sidewalls 64 each defining a plurality of fixing holes 66, and a front side 61 and a rear side (not labeled) respectively connected to front and rear ends of the two sidewalls 64. The rear side includes an interface 62.

Each fastener 40 is a screw or bolt with a coin-shaped head portion 42. The fasteners 40 are screwed into the fixing holes 66 of the corresponding data storage devices 60.

Figure 2:
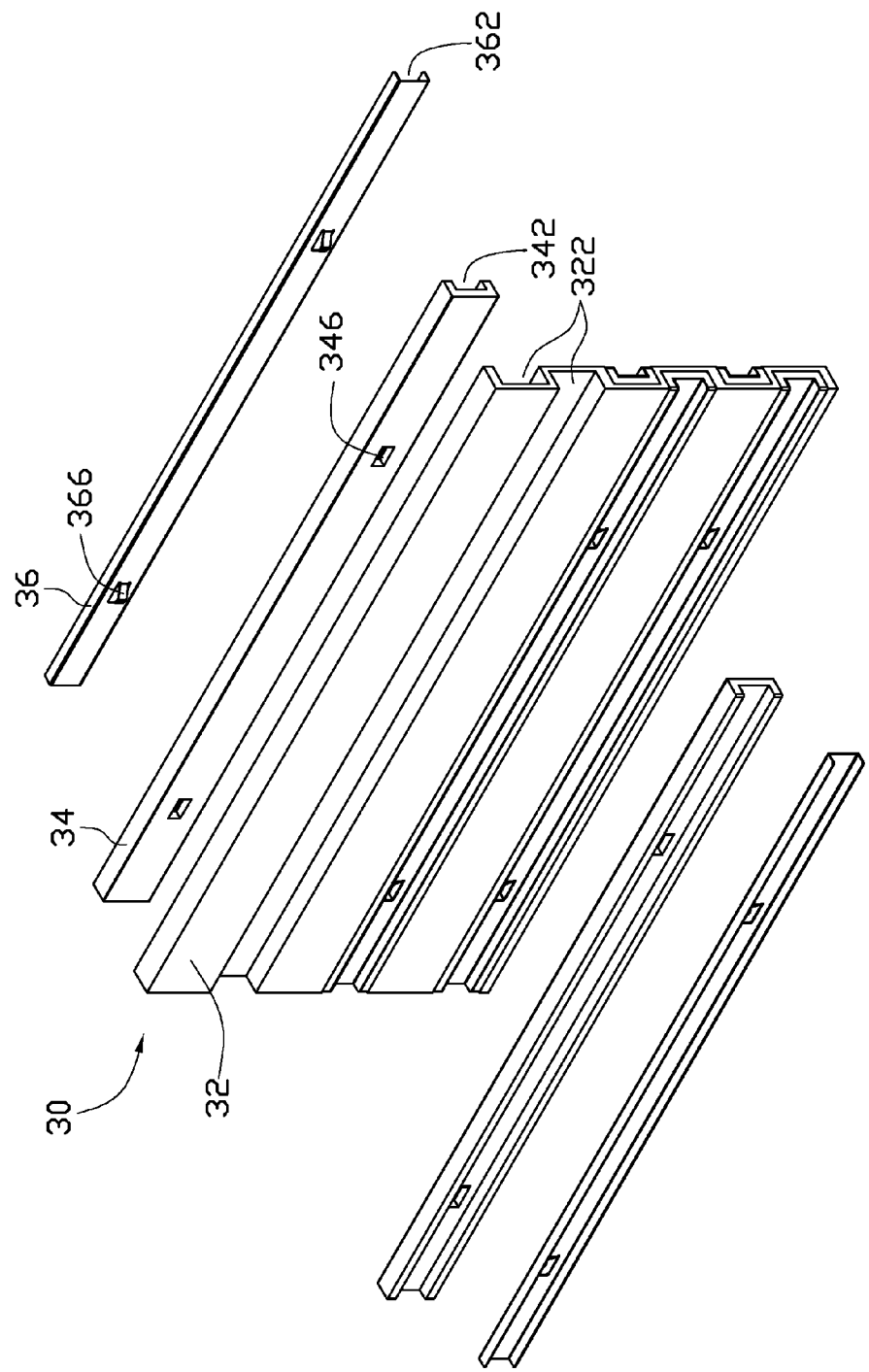
FIG. 2 is a partially exploded, isometric view of one of the fixing members of FIG. 1.

Referring to FIG. 2, each fixing member 30 includes a main body 32 having what appear to be multiple squared off "S" shapes connected end to end in cross-section, a plurality of cushioning boards 34, and a plurality of guiding rails 36. The main body 32 includes opposite sides, each side defines a plurality of parallel fixing grooves 322. The cushioning boards 34 are made of rubber, plastic, or other vibration-absorptive material. Each cushioning board 34 has a U-shaped cross-section, and a receiving groove 342 is defined in each cushioning board 34. A plurality of clamping holes 346 are defined in each cushioning board 34, communicating with the receiving groove 342. Each guiding rail 36 defines a sliding groove 362, and a width of the sliding groove 362 is a little greater than a diameter of the head portion 42 of each fastener 40. A plurality of resilient latching portions 366 extend from each guiding rail 36, opposite to the sliding groove 362. The latching portions 366 are wedge-shaped, corresponding to the clamping holes 346 of the corresponding cushioning board 34.

In assembly of each fixing member 30, each cushioning board 34 is compressed, and inserted into one of the plurality of fixing grooves 322 of the main body 32. Therefore, the cushioning board 34 is deformed, and elasticity of the cushioning board 34 forces the cushioning board 34 to be clamped in the corresponding fixing groove 322. In another embodiment, each cushioning board 34 can be fixed to the corresponding fixing groove 322 with fasteners such as bolts (not shown). Each guiding rail 36 is slid into the corresponding receiving groove 342 of the corresponding cushioning board 34, with the latching portions 366 of the guiding rail 36 engaging in the corresponding clamping holes 346 of the cushioning board 34.

In another embodiment, the cushioning boards 34 can be omitted. The guiding rails 36 are directly engaged in the corresponding fixing grooves 322 of the main body 32 with bolts, or each fixing groove 322 defines a plurality of engaging holes to fix the latching portions 366 of the corresponding guiding rail 36.

The bracket 20 includes a bottom plate 22, and two opposite side plates 24 perpendicularly extending up from opposite sides of the bottom plate 22. A circuit board 26 perpendicularly extends up from a rear portion of the bottom plate 22, and is perpendicularly connected between the side plates 24. The plurality of fixing members 30 are perpendicularly fixed to the bottom plate 22 parallel to the side plates 24, with the sliding grooves 362 of the guiding rails 36 of the fixing members 30 parallel to the bottom plate 22, and the fixing grooves 322 on opposite sides of the main body 32 spaced and aligned with each other in a line perpendicular to the bottom plate 22. A rear end of each fixing member 30 is connected to the circuit board 26, therefore, a receiving space 29 is formed between two adjacent fixing members 30. Thereby, the bracket 20 is divided into several receiving spaces 29 by the fixing members 30, each to accommodate many data storage devices 60. The opposite outmost fixing members 30 abut the side plates 24, respectively. In this embodiment, the outmost fixing members 30 each have a plane side abutting the side plates 24. Every two opposite sliding grooves 362 facing one of the same receiving space 29 of the adjacent fixing members 30 are correspondingly aligned coplanarly. A plurality of connectors 262 extend from the circuit board 26 into each receiving space 29.

Figure 3:
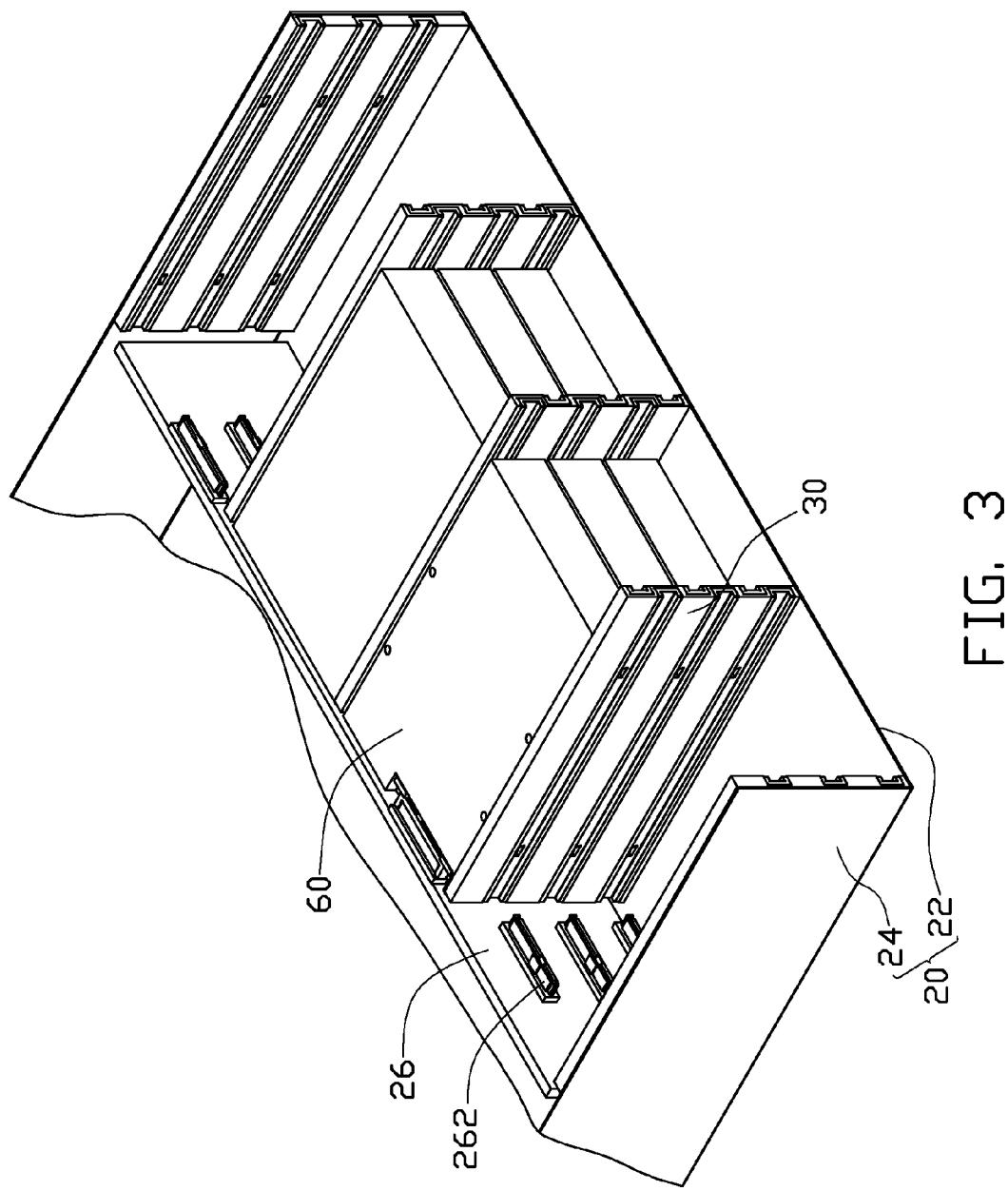
FIG. 3 is an assembled, isometric view of the mounting apparatus and the data storage devices of FIG. 1.
Figure 4:
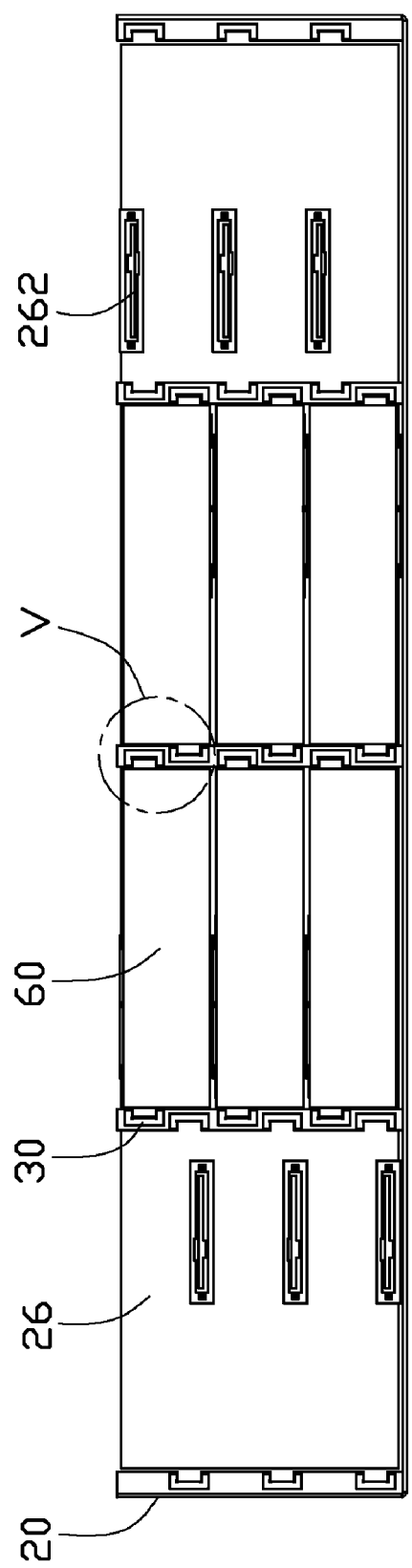
FIG. 4 is a front plan view of FIG. 3.

Referring to FIGS. 3 to 5, to assemble the plurality of data storage devices 60 to the mounting apparatus 10, each data storage device 60 is pushed into one of the receiving spaces 29 of the bracket 20, with the head portions 42 of the fasteners 40 sliding in two corresponding paired sliding grooves 362 of the adjacent fixing members 30. When the interface 62 of the data storage device 60 is engaged in the corresponding connector 262 of the circuit board 26, the data storage device 60 is completely assembled in the bracket 20, and electrically connected to the circuit board 26. Thereafter, a top plate and a front plate (not shown) are fixed to a top of the bracket 20 and a front of the bracket 20, respectively, to prevent the plurality of data storage devices 60 from disengaging from the bracket 20.

To detach the plurality of data storage devices 60, the top and front plates are removed from the bracket 20, and then the plurality of data storage devices 60 are pulled out from the receiving spaces 29 of the bracket 20.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A mounting apparatus for a plurality of data storage devices each including opposite sidewalls, the mounting apparatus comprising:
    a bracket comprising a bottom plate;
    a plurality of fasteners fixed to the sidewalls of each data storage device, each fastener comprising a head portion; and
    a plurality of fixing members each comprising a main body perpendicularly fixed to the bottom plate of the bracket, wherein the main body has multiple squared off "S" shapes connected end to end in cross-section, opposite sides of the main body each define a plurality of fixing grooves parallel with the bottom plate, and the fixing grooves on opposite sides of the main body are spaced and aligned with each other in a line perpendicular to the bottom plate, and
    wherein a receiving space is formed between two adjacent fixing members to accommodate the data storage devices, every fixing groove facing a receiving space is paired with an opposite fixing groove facing the same receiving space; when the data storage devices are moved into the receiving spaces along the fixing members, respectively, the head portions are slid into the corresponding paired fixing grooves.

2. The mounting apparatus of claim 1, wherein a plurality of guiding rails are respectively engaged in the fixing grooves, each guiding rail defines a sliding groove facing the corresponding receiving space, for receiving the head portions of a corresponding one of the data storage devices.

3. The mounting apparatus of claim 2, wherein a width of each sliding groove is slightly greater than a diameter of each head portion.

4. The mounting apparatus of claim 2, wherein each fixing member further comprises a plurality of cushioning boards positioned between the fixing grooves and the corresponding guiding rails, each cushioning board is made of rubber, plastic, or other vibration-absorptive material.

5. The mounting apparatus of claim 4, wherein each cushioning board is generally U-shaped, and a receiving groove is defined in the cushioning board, for fixing a corresponding guiding rail.

6. The mounting apparatus of claim 5, wherein each cushioning board defines a plurality of clamping holes communicating with the corresponding receiving groove, a plurality of latching portions extend from each guiding rail, to engage in the clamping holes, respectively.

7. The mounting apparatus of claim 6, wherein the latching portions are wedge-shaped, and opposite to the sliding groove.

8. The mounting apparatus of claim 1, further comprising a circuit board to be electrically connected to the plurality of data storage devices, wherein the circuit board perpendicularly extends from the bottom plate.

9. The mounting apparatus of claim 1, each paired fixing grooves are aligned coplanarly.

* * * * *